United States Patent
Oh et al.

(10) Patent No.: US 9,514,758 B2
(45) Date of Patent: *Dec. 6, 2016

(54) METHOD AND AN APPARATUS FOR PROCESSING AN AUDIO SIGNAL

(71) Applicant: LG ELECTRONICS INC., Seoul (KR)

(72) Inventors: Hyen-O Oh, Gwacheon-si (KR); Yang Won Jung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 298 days.

This patent is subject to a terminal disclaimer.

(21) Appl. No.: 14/178,048

(22) Filed: Feb. 11, 2014

(65) Prior Publication Data

US 2014/0161261 A1 Jun. 12, 2014

Related U.S. Application Data

(63) Continuation of application No. 12/811,344, filed as application No. PCT/KR2008/007869 on Dec. 31, 2008, now Pat. No. 8,670,576.

(60) Provisional application No. 61/018,488, filed on Jan. 1, 2008, provisional application No. 61/018,489, filed on Jan. 1, 2008, provisional application No. 61/081,042, filed on Jul. 16, 2008.

(51) Int. Cl.
*G10L 19/008* (2013.01)
*H04S 3/02* (2006.01)
(Continued)

(52) U.S. Cl.
CPC ....... *G10L 19/008* (2013.01); *G11B 20/00992* (2013.01); *H04S 3/008* (2013.01); *G11B 2020/10546* (2013.01); *H04S 2420/03* (2013.01)

(58) Field of Classification Search
CPC ..... G10L 19/008; G10L 19/20; G10L 19/24; G10L 19/00; H04S 2420/03

USPC ........ 381/17–19, 119, 300, 309–310, 97–98
See application file for complete search history.

(56) References Cited

U.S. PATENT DOCUMENTS

| | | |
|---|---|---|
| 5,706,309 A | 1/1998 | Eberlein et al. |
| 7,003,467 B1 | 2/2006 | Smith et al. |

(Continued)

FOREIGN PATENT DOCUMENTS

| | | |
|---|---|---|
| GB | 2 065 426 A | 6/1981 |
| JP | 02-112098 A | 4/1990 |

(Continued)

OTHER PUBLICATIONS

"Draft Call for Proposals on Spatial Audio Object Coding," International Organisation for Standardisation Organisation Internationale de Normalisation, ISO/IEC JTC1/SC29/W11, ITU Study Group 16—Video Coding Experts Group, Oct. 2006, XP030015133.

(Continued)

*Primary Examiner* — George Monikang
(74) *Attorney, Agent, or Firm* — Birch, Stewart, Kolasch & Birch, LLP

(57) ABSTRACT

A method of processing an audio signal, the method including receiving a downmix signal including at least one object signal, and object information extracted when the downmix signal is generated, the at least one object signal including a background object and at least one independent object; receiving mix information including mode selection information, the mix information for controlling the at least object signal; receiving enhanced object information corresponding to a residual signal generated when the at least one object signal is downmixed to the downmix signal; generating downmix processing information by using the object information and the mix information; generating an output signal by applying the downmix processed information to the downmix signal; and extracting the background object and the at least one independent object from the downmix signal, by using the enhanced object information.

5 Claims, 12 Drawing Sheets

(51) Int. Cl.
H04S 5/02 (2006.01)
H04S 3/00 (2006.01)
G11B 20/00 (2006.01)
G11B 20/10 (2006.01)

(56) References Cited

U.S. PATENT DOCUMENTS

| | | |
|---|---|---|
| 2003/0161479 A1 | 8/2003 | Yang et al. |
| 2005/0177360 A1 | 8/2005 | Schuijers et al. |
| 2006/0045291 A1 | 3/2006 | Smith |
| 2006/0133618 A1 | 6/2006 | Villemoes et al. |
| 2006/0165184 A1 | 7/2006 | Purnhagen et al. |
| 2006/0210087 A1 | 9/2006 | Davis et al. |
| 2006/0239473 A1 | 10/2006 | Kjorling et al. |
| 2007/0223749 A1 | 9/2007 | Kim et al. |

FOREIGN PATENT DOCUMENTS

| | | |
|---|---|---|
| RU | 2129336 C1 | 4/1999 |
| RU | 2005104123 A | 7/2005 |
| WO | WO 2006/048204 A1 | 5/2006 |
| WO | WO 2006/048227 A1 | 5/2006 |
| WO | WO 2006/060279 A1 | 6/2006 |
| WO | WO 2006/108543 A1 | 10/2006 |
| WO | WO 2006/108573 A1 | 10/2006 |
| WO | WO 2007/080225 A1 | 7/2007 |
| WO | WO 2007/083952 A1 | 7/2007 |
| WO | WO 2007/083958 A1 | 7/2007 |
| WO | WO 2007/091870 A1 | 8/2007 |
| WO | WO 2007/128523 A1 | 11/2007 |
| WO | WO 2008/063034 A1 | 5/2008 |

OTHER PUBLICATIONS

Audio Subgroup, "Final Spatial Audio Object Coding Evaluation Procedures and Criterion", International Organisation for Standardisation, ISO/IEC JTC1/SC29/WG11, MPEG2007/N9099, San Jose, USA, pp. 1-14, XP030015593, Apr. 2007.
Audio Subgroup, "Call for Proposals on Spatial Audio Object Coding", International Organisation for Standardisation, ISO/IEC JTC1/SC29/WG11, Coding of Moving Pictures and Audio, MPEG2007/N8853, Jan. 2007, 20 pages provided.
Breebaart et al., "Background, Concept, and Architecture for the Recent MPEG Surround Standard on Multichannel Audio Compression", Journal of the Audio Engineering Society, vol. 55, No. 5, pp. 331-351, XP008099918, May 2007.
Breebaart et al., "MPEG Surround Binaural Coding Proposal Philips/CT/FhG/VAST Audio," International Organization for Standardization, Coding of Moving Pictures and Associated Audio, ISO/IEC JTC1/SC29/WG11, M13253, Montreux, CH, pp. 1-49, Apr. 2006.
Breebaart et al., "Multi-Channel Goes Mobile: MPEG Surround Binaural Rendering", AES 29th International Conference, Seoul, Korea, pp. 1-13, XP007902577, Sep. 2-4, 2006.
Breebaart et al., "Parametric Coding of Stereo Audio", EURASIP Journal on Applied Signal Processing, vol. 9, pp. 1305-1322, XP-002514252, 2005.
Breebaart et al., "Spatial Pyschoacoustics as the Basis for Innovations in the Field of Audio Coding and Processing", 19th International Congress on Acoustics, Madrid, Spain, pp. 1-6, XP002613501, Sep. 2-7, 2007.
Engdegard et al., "Spatial Audio Object Coding (SAOC)—The Upcoming MPEG Standard on Parametric Object Based Audio Coding," Audio Engineering Society Convention Paper, 124th Convention, May 17-20, 2008, Amsterdam, The Netherlands, pp. 1-15.
Faller, "Parametric Joint-Coding of Audio Sources", Audio Engineering Society 120th Convention, Convention Paper 6752, Paris, France, pp. 1-12, XP040507646, May 20-23, 2006.
Herre et al., "New Concepts in Parametric Coding of Spatial Audio; From SAC to SAOC," Multimedia and Exp. 2007 IEEE International Conference on IEEE, 2007, XP031124020, pp. 1894-1897.
Herre et al., "The Reference Model Architecture for MPEG Spatial Audio Coding", Audio Engineering Society 118th Convention, Convention Paper 6447, Barcelona, Spain, pp. 1-13, XP009059973, May 28-31, 2005.
Lee et al., "A Personalized Preset-based Audio System for Interactive Service", Audio Engineering Society 121st Convention, Convention Paper 6904, San Francisco, California, pp. 1-6, XP040507827, Oct. 5-8, 2006.
Neusinger, "MPEG Surround Audio Coding on TI Floating-Point DSPs", Texas Insturments Developer Conference, Dallas, Texas, XP-002613502, Mar. 7-9, 2007.
Oh et al., "Comments on Draft Call for Proposals on Spatial Audio Object Coding", International Organization for Standardization, ISO/IEC JTC1/SC29/WG11, MPEG2007/m14159, Marrakech, MA, pp. 1-6, XP030042815, Jan. 2007.
Quackenbush, "Draft Spatial Audio Object Coding Evaluation Procedures and Criterion", International Organisation for Standardisation, ISO/IEC JTC/SC29/WG11, MPEG2007/M14315, San Jose, USA, pp. 1-14, XP030042952, Apr. 2007.
Schuijers et al., "Comments on Draft Call for Proposals Spatial Audio Object-based Coding", International Organisation for Standardisation, ISO/IEC JTC1/SC29/WG11, MPEG2007/M14201, Marrakech, MA, XP030042857, Jan. 2007.
Villemoes et al., "MPEG Surround: The Forthcoming ISO Standard for Spatial Audio Coding," AES 28th International Conference, Pitea, Sweden, 2006, pp. 1-18, XP040507933.

METHOD AND AN APPARATUS FOR PROCESSING AN AUDIO SIGNAL

CROSS-REFERENCE TO RELATED APPLICATIONS

This application is a Continuation of co-pending U.S. patent application Ser. No. 12/811,344 filed on Jun. 30, 2010, which is the national phase of PCT International Application No. PCT/KR2008/007869 filed on Dec. 31, 2008, which claims priority to U.S. Provisional Application Nos. 61/018,488 filed on Jan. 1, 2008, 61/018,489 filed on Jan. 1, 2008, and 61/081,042 filed on Jul. 16, 2008, the entire contents of all of the above applications are hereby incorporated by reference.

BACKGROUND OF THE INVENTION

Field of the Invention

The present invention relates to an apparatus for processing an audio signal and method thereof. Although the present invention is suitable for a wide scope of applications, it is particularly suitable for processing an audio signal received via a digital medium, a broadcast signal and the like.

Discussion of the Related Art

Generally, in the process for downmixing a plurality of objects into a mono or stereo signal, parameters are extracted from the object signals, respectively. These parameters are usable for a decoder. Panning and gain of each of the objects is controllable by a user selection.

SUMMARY OF THE INVENTION

However, in order to control each object signal, each source contained in a downmix should be appropriately positioned or panned.

Moreover, in order to provide backward compatibility according to a channel-oriented decoding scheme, an object parameter should be converted to a multi-channel parameter for upmixing.

Accordingly, the present invention is directed to an apparatus for processing an audio signal and method thereof that substantially obviate one or more of the problems due to limitations and disadvantages of the related art.

An object of the present invention is to provide an apparatus for processing an audio signal and method thereof, by which a mono signal, a stereo signal and a multi-channel signal can be outputted by controlling gain and panning of an object.

Another object of the present invention is to provide an apparatus for processing an audio signal and method thereof, by which a mono signal and a stereo signal can be outputted from a downmix signal without performing a complicated scheme of a multi-channel decoder.

A further object of the present invention is to provide an apparatus for processing an audio signal and method thereof, by which distortion of a sound quality can be prevented in case of adjusting a gain of a vocal or background music with a considerable width.

Accordingly, the present invention provides the following effects or advantages.

First of all, the present invention is able to control gain and panning of an object without limitation.

Secondly, the present invention is able to control gain and panning of an object based on a user-selection.

Thirdly, in case that an output mode is a mono or stereo, the present invention generates an output signal without performing a complicated scheme of a multi-channel decoder, thereby facilitating implementation and lowering complexity.

Fourthly, in case that one or two speakers are provided for such a device as a mobile device, the present invention is able to control gain and panning of an object for a downmix signal without a codec coping with a multi-channel decoder.

Fifthly, in case that either a vocal or background music is completely suppressed, the present invention is able to prevent distortion of a sound quality according to gain adjustment.

Sixthly, in case that at least two independent objects (stereo channel or several vocal signals) such as a vocal and the like exist, the present invention is able to prevent distortion of a sound quality according to gain adjustment.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
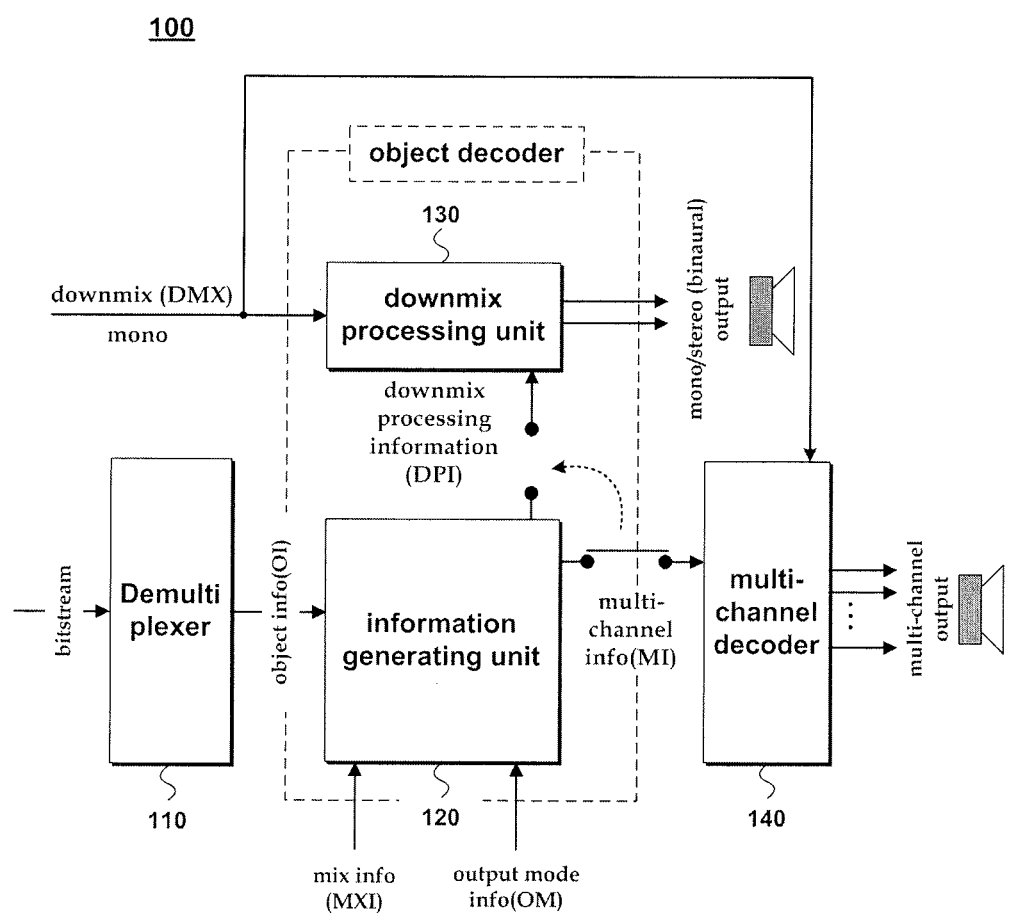
FIG. 1 is a block diagram of an apparatus for processing an audio signal according to an embodiment of the present invention for generating a mono/stereo signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of processing an audio signal according to the present invention includes receiving a downmix signal including at least one object signal and object information extracted when the downmix signal is generated, receiving mix information for controlling the object signal, generating one of downmix processing information and multi-channel information using the object information and the mix information according to an output mode, and if the downmix processing information is generated, generating an output signal by applying the downmix processing information to the downmix signal, wherein the downmix signal and the output signal correspond to a mono signal and wherein the multi-channel information corresponds to information for upmixing the downmix signal into a plurality of channel signals.

According to the present invention, the downmix signal and the output signal correspond to a signal on a time domain.

According to the present invention, the generating the output signal includes generating a subband signal by decomposing the downmix signal, processing the subband signal using the downmix processing information, and generating the output signal by synthesizing the subband signal.

According to the present invention, the output signal includes a signal generated by decorrelating the downmix signal.

According to the present invention, the method further includes generating the plurality of the channel signals by upmixing the downmix signal using the multi-channel information if the multi-channel information is generated.

According to the present invention, the output mode is determined according to a speaker channel number and the speaker channel number is based on one of device information and the mix information.

According to the present invention, the mix information is generated based on at least one of object position information, object gain information and playback configuration information.

To further achieve these and other advantages and in accordance with the purpose of the present invention, an apparatus for processing an audio signal includes a demultiplexer receiving a downmix signal including at least one object signal, and object information extracted when the downmix signal is generated, an information generating unit generating one of downmix processing information and multi-channel information using the object information and mix information for controlling the object signal according to an output mode, and a downmix processing unit, if the downmix processing information is generated, generating an output signal by applying the downmix processing information to the downmix signal, wherein the downmix signal and the output signal correspond to a mono signal and wherein the multi-channel information corresponds to information for upmixing the downmix signal into a plurality of channel signals.

According to the present invention, the downmix processing unit includes a subband decomposing unit generating a subband signal by decomposing the downmix signal, an M2M processing unit processing the subband signal using the downmix processing information, and a subband synthesizing unit generating the output signal by synthesizing the subband signal.

To further achieve these and other advantages and in accordance with the purpose of the present invention, a method of processing an audio signal according to the present invention includes receiving a downmix signal including at least one object signal and object information extracted when the downmix signal is generated, receiving mix information for controlling the object signal, generating one of downmix processing information and multi-channel information using the object information and the mix information according to an output mode, and if the downmix processing information is generated, generating an output signal by applying the downmix processing information to the downmix signal, wherein the downmix signal corresponds to a mono signal, wherein the output signal corresponds to a stereo signal generated by applying a decorrelator to the downmix signal, and wherein the multi-channel information corresponds to information for upmixing the downmix signal into a multi-channel signal.

According to the present invention, the downmix signal and the output signal correspond to a signal on a time domain.

According to the present invention, the generating the output signal includes generating a subband signal by decomposing the downmix signal, generating two subband signals by processing the subband signal using the downmix processing information, and generating the output signal by synthesizing the two subband signals respectively.

According to the present invention, the generating the two subband signals includes generating a decorrelated signal by decorrelating the subband signal and generating the two subband signals by processing the decorrelated signal and the subband signal using the downmix processing information.

According to the present invention, the downmix processing information includes a binaural parameter and the output signal corresponds to a binaural signal.

According to the present invention, the method further includes generating a plurality of channel signals by upmixing the downmix signal using the multi-channel information if the multi-channel information is generated.

According to the present invention, the output mode is determined according to a speaker channel number and the speaker channel number is based on one of device information and the mix information.

To further achieve these and other advantages and in accordance with the purpose of the present invention, an apparatus for processing an audio signal includes a demultiplexer receiving a downmix signal including at least one object signal, a time domain downmix signal, and object information extracted when the downmix signal is generated, an information generating unit generating one of downmix processing information and multi-channel information using mix information for controlling the object signal and the object information according to an output mode, and a downmix processing unit, if the downmix processing information is generated, generating an output signal by applying the downmix processing information to the downmix signal, wherein the downmix signal corresponds to a mono signal, wherein the output signal corresponds to a stereo signal generated by applying a decorrelator to the downmix signal, and wherein the multi-channel information corresponds to information for upmixing the downmix signal into a plurality of channel signals.

To further achieve these and other advantages and in accordance with the purpose of the present invention, a method of processing an audio signal according to the present invention includes receiving a downmix signal including at least one object signal and object information extracted when the downmix signal is generated, receiving mix information including mode selection information, the mix information for controlling the object signal, bypassing the downmix signal or extracting a background object and at least one independent object from the downmix signal based on the mode selection information, and if the downmix signal is bypassed, generating multi-channel information using the object information and the mix information, wherein the downmix signal corresponds to a mono signal and wherein the mode selection information includes information indicating which one of modes including a normal mode, a mode for controlling the background object, and a mode for controlling the at least one independent object.

According to the present invention, the method further includes receiving enhanced object information, wherein the at least one independent object is extracted from the downmix signal using the enhanced object information.

According to the present invention, the enhanced object information corresponds to a residual signal.

According to the present invention, the at least one independent object corresponds to an object based signal and the background object corresponds to a mono signal.

According to the present invention, the stereo output signal is generated if the mode selection mode corresponds to the normal mode. And, the background object and the at least one independent object are extracted if the mode selection mode corresponds to one of the mode for controlling the background object and the mode for controlling the at least one independent object.

According to the present invention, the method further includes, if the background object and the at least one independent object are extracted from the downmix signal, generating at least one of first multi-channel information for controlling the background object and second multi-channel information for controlling the at least one independent object.

To further achieve these and other advantages and in accordance with the purpose of the present invention, an apparatus for processing an audio signal includes a demultiplexer receiving a downmix signal including at least one object signal and object information extracted when the downmix signal is generated, an object transcoder bypassing the downmix signal or extracting a background object and at least one independent object from the downmix signal, based on mode selection information included in mix information for controlling the object signal, and a multi-channel decoder, if the downmix signal is bypassed, generating multi-channel information using the object information and the mix information, wherein the downmix signal corresponds to a mono signal, wherein the output signal corresponds to a stereo signal generated by applying a decorrelator to the downmix signal, and wherein the mode selection information includes information indicating which one of modes including a normal mode, a mode for controlling the background object, and a mode for controlling the at least one independent object.

To further achieve these and other advantages and in accordance with the purpose of the present invention, a method of processing an audio signal according to the present invention includes receiving a downmix signal including at least one object signal and object information extracted when the downmix signal is generated, receiving mix information including mode selection information, the mix information for controlling the object signal, and generating a stereo output signal using the downmix signal or extracting a background object and at least one independent object from the downmix signal based on the mode selection information, wherein the downmix signal corresponds to a mono signal, wherein the stereo output signal corresponds to a time-domain signal including a signal generated by decorrelating the downmix signal, and wherein the mode selection information includes information indicating which one of modes including a normal mode, a mode for controlling the background object, and a mode for controlling the at least one independent object.

According to the present invention, the method further includes receiving enhanced object information, wherein the at least one independent object is extracted from the downmix signal using the enhanced object information.

According to the present invention, the enhanced object information corresponds to a residual signal.

According to the present invention, the at least one independent object corresponds to an object based signal and the background object corresponds to a mono signal.

According to the present invention, the stereo output signal is generated if the mode selection mode corresponds to the normal mode. And, the background object and the at least one independent object are extracted if the mode selection mode corresponds to one of the mode for controlling the background object and the mode for controlling the at least one independent object.

According to the present invention, the method further includes, if the background object and the at least one independent object are extracted from the downmix signal, generating at least one of first multi-channel information for controlling the background object and second multi-channel information for controlling the at least one independent object.

To further achieve these and other advantages and in accordance with the purpose of the present invention, an apparatus for processing an audio signal includes a demultiplexer receiving a downmix signal including at least one object signal and object information extracted when the downmix signal is generated and an object transcoder generating a stereo output signal using the downmix signal or extracting a background object and at least one independent object from the downmix signal based on mode selection information included in mix information for controlling the object signal, wherein the downmix signal corresponds to a mono signal, wherein the stereo output signal corresponds to a time-domain signal including a signal generated by decorrelating the downmix signal, and wherein the mode selection information includes information indicating which one of modes including a normal mode, a mode for controlling the background object, and a mode for controlling the at least one independent object.

It is to be understood that both the foregoing general description and the following detailed description are exemplary and explanatory and are intended to provide further explanation of the invention as claimed.

Reference will now be made in detail to the preferred embodiments of the present invention, examples of which are illustrated in the accompanying drawings. First of all, terminologies in the present invention can be construed as the following references. And, terminologies not disclosed in this specification can be construed as the following meanings and concepts matching the technical idea of the present invention.

Specifically, 'information' in this disclosure is the terminology that generally includes values, parameters, coefficients, elements and the like and its meaning can be construed as different occasionally, by which the present invention is not limited.

An object has the concept including both an object based signal and a channel based signal. Occasionally, an object can include an object based signal only.

In case that a mono downmix signal is received, the present invention intends to describe various processes for processing a mono downmix signal. First of all, a method of generating a mono/stereo signal or a plurality of channel signals from a mono downmix signal if necessary shall be explained with reference to FIGS. 1 to 3. Secondly, a method of generating a binaural signal from a mono downmix signal (or a stereo downmix signal) shall be explained with reference to FIGS. 4 to 6. Thirdly, various embodiments for a method of controlling an independent object signal (or a mono background signal) contained in a mono downmix are explained with reference to FIGS. 7 to 12.

1. Generation of Mono/Stereo Signal

FIG. 1 is a block diagram of an apparatus for processing an audio signal according to an embodiment of the present invention for generating a mono/stereo signal.

Referring to FIG. 1, an apparatus 100 for processing an audio signal according to an embodiment of the present invention includes a demultiplexer 110, an information generating unit 120, and a downmix processing unit 130. The audio signal processing apparatus 100 can further include a multi-channel decoder 140.

The demultiplexer 110 receives object information (OI) via a bitstream. The object information (OI) is the information on objects contained within a downmix signal and is able to include object level information, object correlation information, and the like. The object information (OI) is able to contain an object parameter (OP) that is a parameter indicating an object characteristic.

The bitstream further contains a downmix signal (DMX). The demultiplexer 110 is able to further extract the downmix signal (DMX) from this bitstream. The downmix signal (DMX) is the signal generated from downmixing at least one object signal and may correspond to a signal on a time domain. The downmix signal (DMX) may be a mono signal or a stereo signal. In the present embodiment, the downmix signal (DMX) is a mono signal for example.

The information generating unit 120 receives the object information (OI) from the demultiplexer 110. The information generating unit 120 receives mix information (MXI) from a user interface. The information generating unit 120 receives output mode information (OM) from the user interface or device. The information generating unit 120 is able to further receive HRTF (head-related transfer function) parameter from HRTF DB.

In this case, the mix information (MXI) is the information generated based on object position information, object gain information, playback configuration information and the like. The object position information is the information inputted for a user to control a position or panning of each object. The object gain information is the information inputted for a user to control a gain of each object. Specifically, the object position information or the object gain information may be the one selected from preset modes. In this case, the preset mode is the value for presetting a specific gain or position of an object in process of time. The preset mode information can be a value received from another device or a value stored in a device. Meanwhile, selecting one from at least one or more preset modes (e.g., preset mode not in use, preset mode 1, preset mode 2, etc.) can be determined by a user input.

The playback configuration information is the information containing the number of speakers, a position of speaker, ambient information (virtual position of speaker) and the like. The playback configuration information can be inputted by a user, can be stored in advance, or can be received from another device.

The output mode information (OM) is the information on an output mode. For instance, the output mode information (OM) can include the information indicating how many signals are used for output. This information indicating how many signals are used for output can correspond to one of a mono output mode, a stereo output mode, a multi-channel output mode and the like. Meanwhile, the output mode information (OM) may be identical to the number of speakers of the mix information (MXI). If the output mode information (OM) is stored in advance, it is based on device information. If the output mode information (OM) is inputted by a user, it is based on user input information. In this case, the user input information can be included in the mix information (MXI).

The information generating unit 120 generates one of downmix processing information (DPI) and multi-channel information (MI) using the object information (OI) and the mix information (MXI), according to an output mode. In this case, the output mode is based on the above-explained output mode information (OM). If the output mode is a mono output or a stereo signal, the information generating unit 120 generates the downmix processing information (DPI). If the output mode is a multi-channel output, the information generating unit 120 generates the multi-channel information (MI). In this case, the downmix processing information (DPI) is the information for processing a downmix signal (DMX), of which details will be explained later. The multi-channel information (MI) is the information for upmixing a downmix signal (DMX) and is able to include channel level information, channel correlation information and the like.

If the output mode is a mono output or a stereo output, the downmix processing information (DPI) is generated only. This is because the downmix processing unit 130 is able to generate a time-domain mono signal or a time-domain stereo signal. Meanwhile, if the output mode is a multi-channel output, the multi-channel information (MI) is generated. This is because the multi-channel decoder 140 can generate a multi-channel signal in case that an input signal is a mono signal.

The downmix processing unit 130 generates a mono output signal or a stereo output signal using the downmix processing information (DPI) and the mono downmix (DMX). In this case, the downmix processing information (DPI) is the information for processing a downmix signal (DMX) and is to control gains and/or pannings of objects contained in the downmix signal.

Meanwhile, the mono output signal or the stereo output signal corresponds to the time-domain signal and may include a PCM signal. In case of the mono output signal, the detailed configuration of the downmix processing unit 130 will be explained with reference to FIG. 2. In case of the stereo output signal, the detailed configuration of the downmix processing unit 130 will be explained with reference to FIG. 3.

Furthermore, the downmix processing information (DPI) can include a binaural parameter. In this case, the binaural parameter is the parameter for 3D effect and may be the information generated by the information generating unit 120 using object information (OI), mix information (MXI) and HRTF parameter. In case that the downmix processing information (DPI) includes the binaural parameter, the downmix processing unit 130 is able to output a binaural signal. An embodiment for generating a binaural signal will be explained in detail with reference to FIGS. 4 to 6 later.

If a stereo downmix signal s received instead of a mono downmix signal [not shown in the drawing], processing for modifying a crosstalk of the downmix signal only is performed rather than a time-domain output signal is generated. The processed downmix signal can be handled by the multi-channel decoder 140 again. Yet, the present invention is not limited by this processing.

If an output mode is a multi-channel output mode, the multi-channel decoder 140 generates a multi-channel signal by upmixing the downmix (DMX) using the multi-channel information. The multi-channel decoder 140 can be implemented according to the standard of MPEG Surround (IS)/IEC 23003-1), by which the present invention is not limited.

Figure 2:
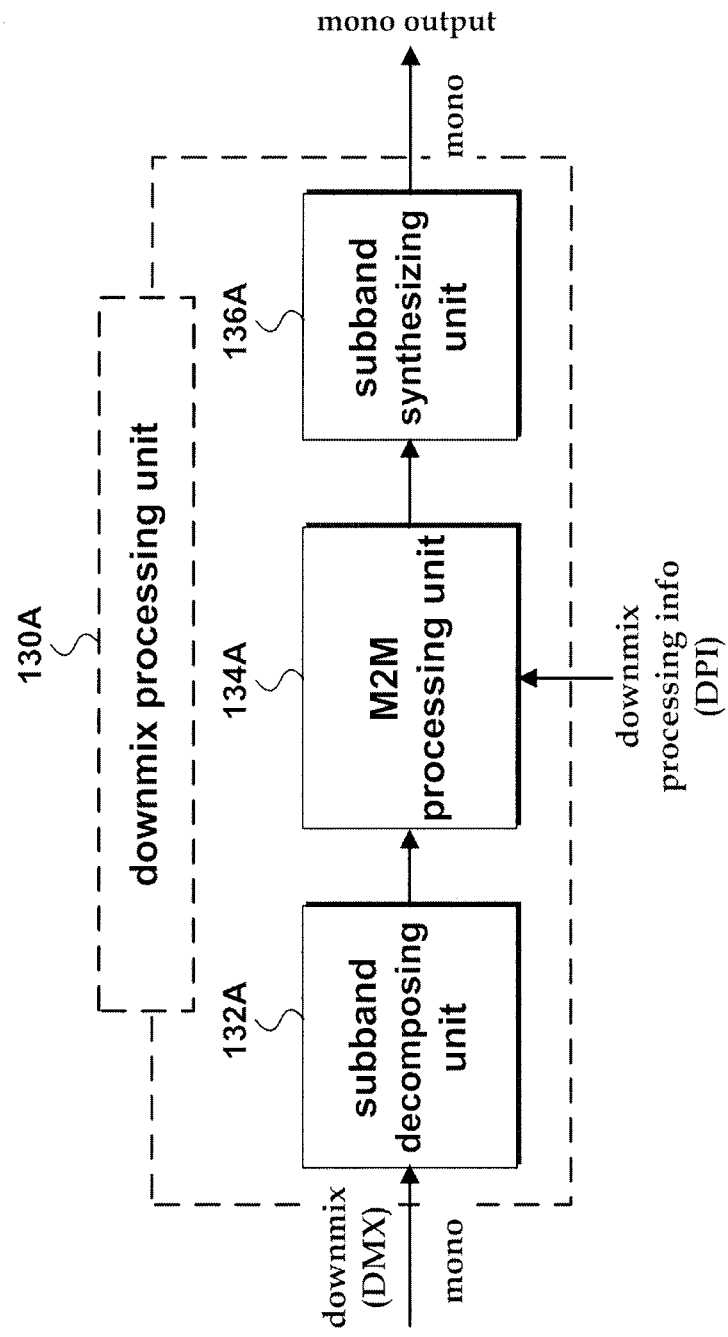
FIG. 2 is a detailed block diagram for a first example of a downmix processing unit shown in FIG. 1.
Figure 3:
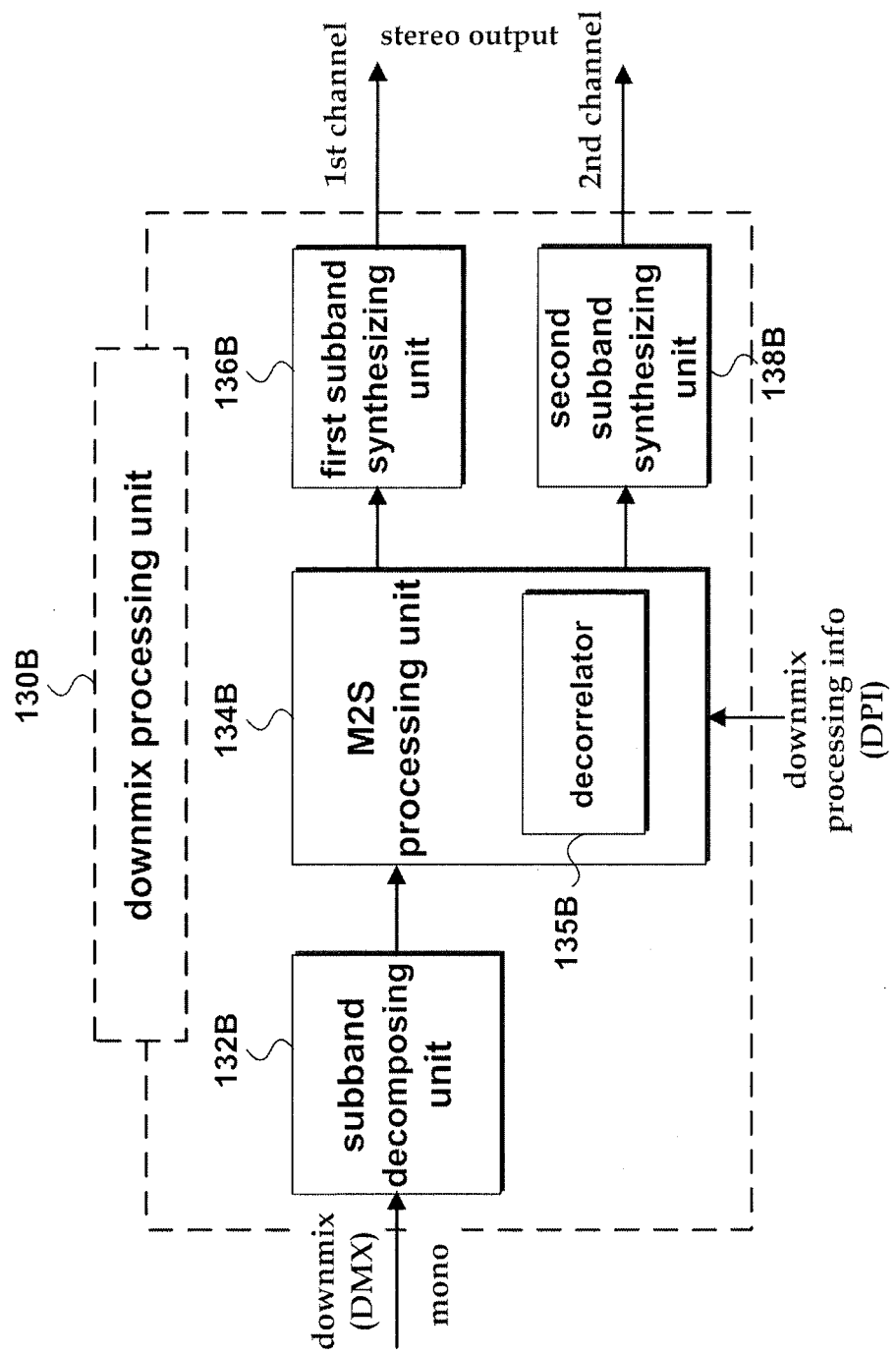
FIG. 3 is a detailed block diagram for a second example of a downmix processing unit shown in FIG. 1.

FIG. 2 is a detailed block diagram for a first example of a downmix processing unit shown in FIG. 1, which is an embodiment for generating a mono output signal. FIG. 3 is a detailed block diagram for a second example of a downmix processing unit shown in FIG. 1, which is an example for generating a stereo output signal.

Referring to FIG. 2, a downmix processing unit 130A includes a subband decomposing unit 132A, an M2M processing unit 134A and a subband synthesizing unit 136A. The downmix processing unit 130A generates a mono output signal from a mono downmix signal.

The subband decomposing unit 132A generates a subband signal by decomposing a mono downmix signal (DMX). The subband decomposing unit 132A is implemented with a hybrid filter bank and the subband signal may correspond to a signal on hybrid QMF domain. The M2M processing unit 134A processes the subband signal using downmix processing information (DPI). In this case, M2M is an abbreviation of mono-to-mono. The M2M processing unit 134A is able to use a decorrelator to process the subband signal. The subband synthesizing unit 136A generates a time-domain mono output signal by synthesizing the processes subband signal. Moreover, the subband synthesizing unit 136A can be implemented with a hybrid filter bank.

Referring to FIG. 3, a downmix processing unit 132B includes a subband decomposing unit 132B, an M2S processing unit 134B, a first subband synthesizing unit 136B and a second subband synthesizing unit 138B. The downmix processing unit 130B receives a mono downmix signal and then generates a stereo output.

Like the former subband decomposing unit 132A shown in FIG. 2, the subband decomposing unit 132B generates a subband signal by decomposing a mono downmix signal (DMX). Likewise, the subband decomposing unit 132B can be implemented with a hybrid filter bank.

The M2S processing unit 134B generates two subband signals (first subband signal and second subband signal) by processing the subband signal using downmix processing information (DPI) and a decorrelator 135B. In this case, M2S is an abbreviation of mono-to-stereo. If the decorrelator 135B is used, it is able to raise a stereo effect by lowering correlation between right and left channels.

Meanwhile, the decorrelator 135B sets the subband signal inputted from the subband decomposing unit 132B to a first subband signal and is then able to output a signal generated by decorrelating the first subband signal as a second subband signal, by which the present invention is not limited.

The first subband synthesizing unit 136B synthesizes the first subband signal, and the second subband synthesizing unit 138B synthesizes the second subband signal, whereby a time-domain stereo output signal is generated.

Thus, in case that a mono downmix is inputted, an embodiment of outputting a mono/stereo output via a downmix processing unit is explained in the above description. In the following description, a case of generating a binaural signal is explained.

2. Generation of Binaural Signal

Figure 4:
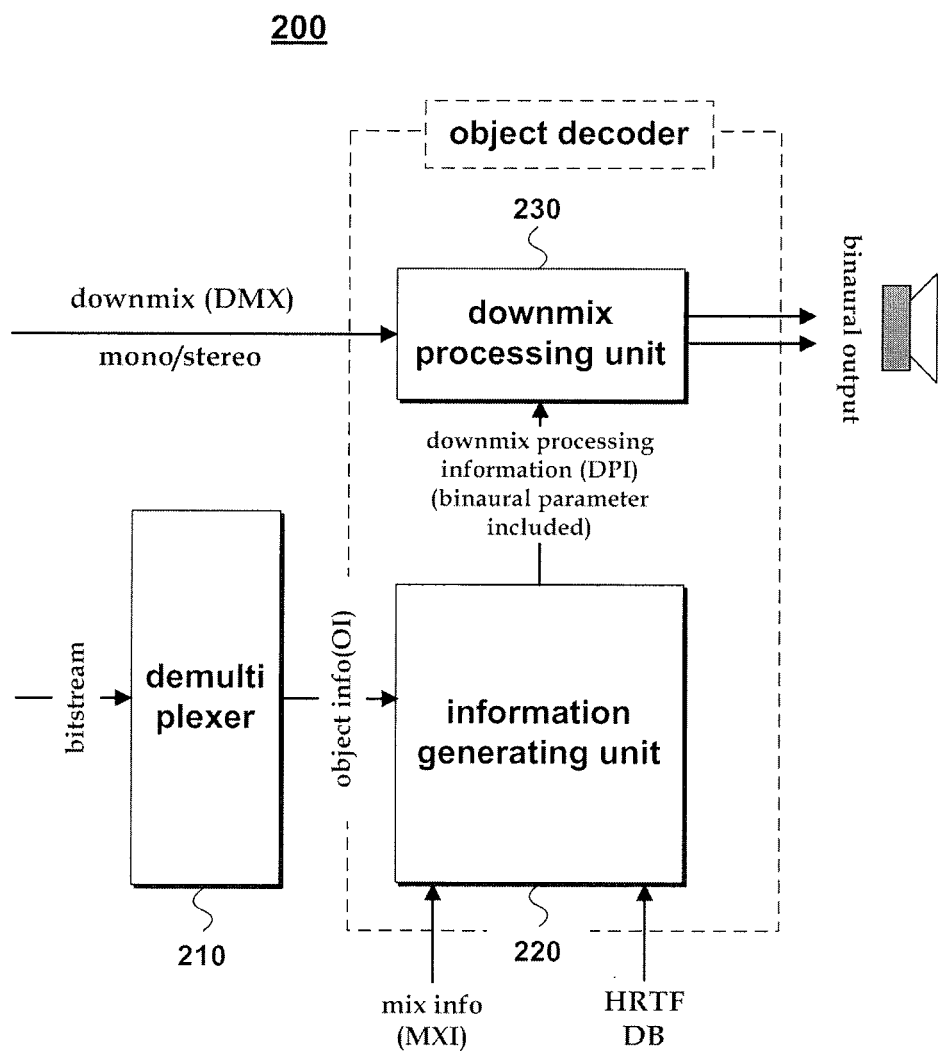
FIG. 4 is a block diagram of an apparatus for processing an audio signal according to one embodiment of the present invention for generating a binaural signal.
Figure 5:
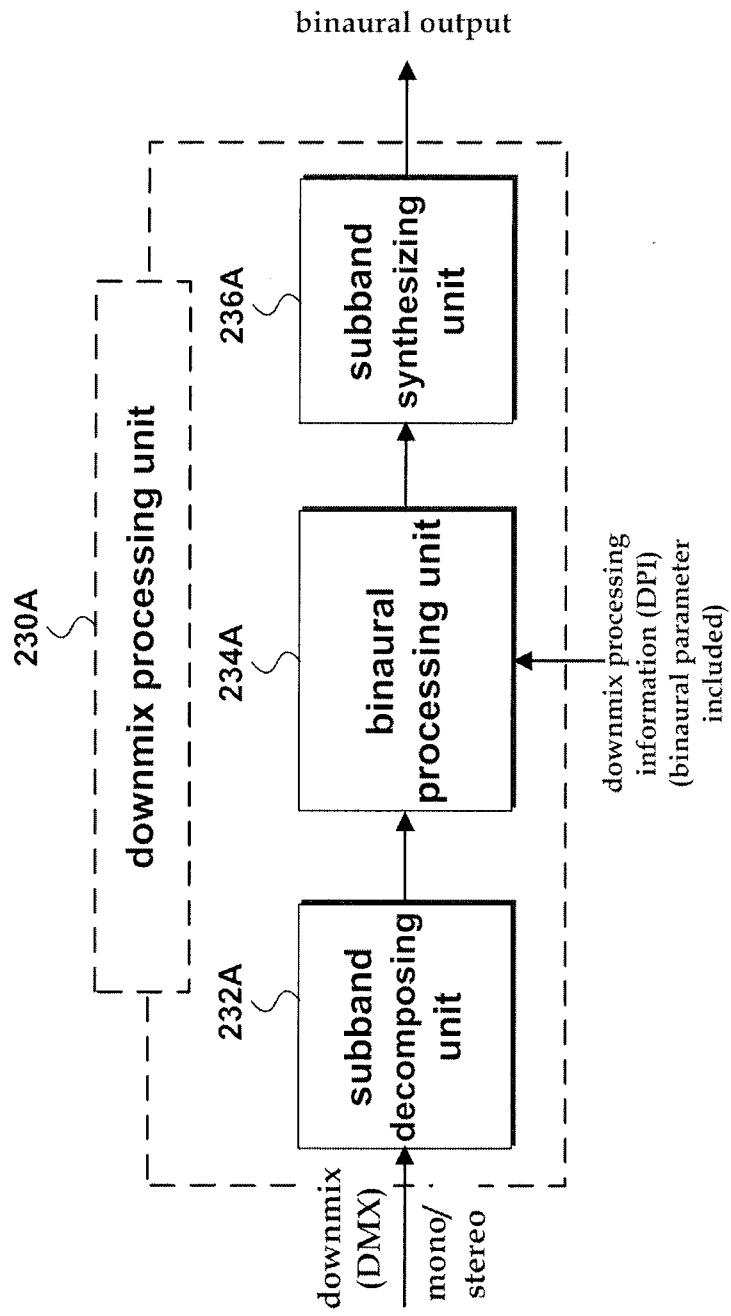
FIG. 5 is a detailed block diagram of a downmix processing unit shown in FIG. 4.
Figure 6:
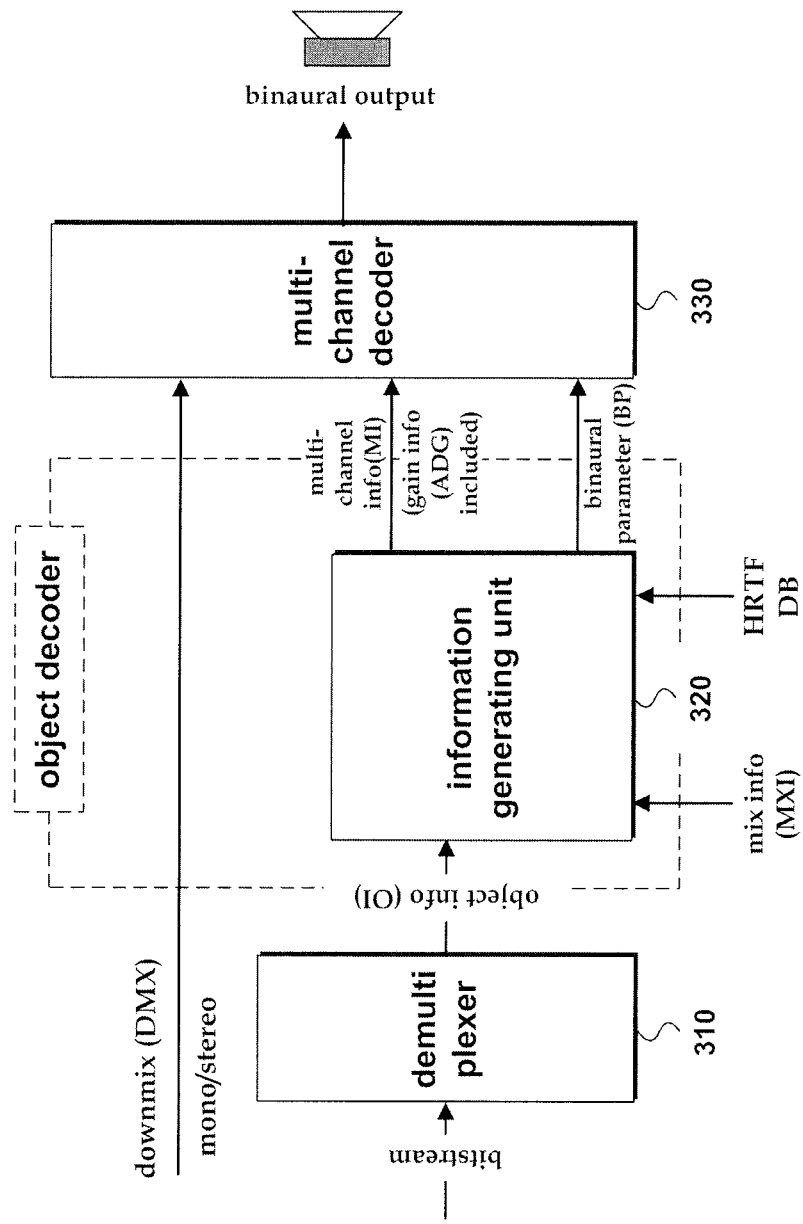
FIG. 6 is a block diagram of an apparatus for processing an audio signal according to another embodiment of the present invention for generating a binaural signal.

FIG. 4 is a block diagram of an apparatus for processing an audio signal according to one embodiment of the present invention for generating a binaural signal. FIG. 5 is a detailed block diagram of a downmix processing unit shown in FIG. 4. FIG. 6 is a block diagram of an apparatus for processing an audio signal according to another embodiment of the present invention for generating a binaural signal.

With reference to FIG. 4 and FIG. 5, one embodiment for generating a binaural signal is explained. With reference to FIG. 6, another embodiment for generating a binaural signal is explained.

Referring to FIG. 4, an audio signal processing apparatus 200 includes a demultiplexer 210, an information generating unit 220 and a downmix processing unit 230. In this case, like the former demultiplexer 110 described with reference to FIG. 1, the demultiplexer 210 extracts object information (OI) from a bitstream and is able to further extract a downmix (DMX) from the bistream. In this case, the downmix signal can be a mono signal or a stereo signal.

The information generating unit 220 generates downmix processing information containing a binaural parameter using the object information (OI), mix information (MXI) and HRTF information. In this case, the HRTF information can be the information extracted from HRTF DB. And, the binaural parameter is the parameter for bringing the virtual 3D effect.

The downmix processing unit 230 outputs a binaural signal using downmix processing information (DPI) that includes the binaural parameter. Detailed configuration of the downmix processing unit 230 is explained with reference to FIG. 5.

Referring to FIG. 5, a downmix processing unit 230A includes a subband decomposing unit 232A, a binaural processing unit 234A and a subband synthesizing unit 236A. The subband decomposing unit 232A generates one or two subband signals by decomposing a downmix signal. The binaural processing unit 234A processes the one or two subband signals using downmix processing information (DPI) containing a binaural parameter. The subband synthesizing unit 236A generates a time-domain binaural output signal by synthesizing the one or two subband signals.

Referring to FIG. 6, an audio signal processing apparatus 300 includes a demultiplexer 310 and an information generating unit 320. The audio signal processing apparatus 300 can further include a multi-channel decoder 330.

The demultiplexer 310 extracts object information (OI) from a bitstream and is able to further extract a downmix signal (DMX) from the bitstream. The information generating unit 320 generates multi-channel information (MI) using the object information (OI) and mix information (MXI). In this case, the multi-channel information (MI) is the information for upmixing the downmix signal (DMX) and includes such a spatial parameter as channel level information and channel correlation information. The information generating unit 320 generates a binaural parameter using HRTF parameter extracted from HRTF DB. The binaural parameter is the parameter for brining the 3D effect and can include the HRTF parameter itself. The binaural parameter is a time-invariant value and can have a dynamic characteristic.

If the downmix signal is a mono signal, the multi-channel information (MI) can further include gain information (ADG). In this case, the gain information (ADG) is the parameter for adjusting a downmix gain and is usable in controlling a gain for a specific object. In case of a binaural output, upsampling or downsampling for an object is necessary. It is preferable to use the gain information (ADG). If the multi-channel decoder 330 follows the MPS Surround standard and the multi-channel information (MI) needs to be configured according to MPEG surround syntax, it is able to use the gain information (ADG) by setting 'bsArbitraryDowmix=1'.

If the downmix signal is a stereo signal, the audio signal processing apparatus 300 can further include a downmix processing unit (not shown in the drawing) for re-panning of right and left cannels of a stereo downmix signal. Yet, in the binaural rendering, cross-term of right and left channels can be generated by a selection of HRTF parameter. Hence, an operation in the downmix processing unit (not shown in the drawing) is not essential. If the downmix signal is stereo and the multi-channel information (MI) follows the MPS surround standard, it is preferably set to 5-2-5 configuration mode. And, it is preferably outputted by bypassing a front left channel and a right front channel only. Besides, the binaural parameter can be transferred in a manner that paths from the right and left front channels to right and left outputs (total four parameter sets) have valid values while the rest of values are zero.

The multi-channel decoder 330 generates a binaural output from the downmix signal using the multi-channel information (MI) and the binaural parameter. In particular, the multi-channel decoder 330 is able to generate a binaural output by applying a combination of the spatial parameter included in the multi-channel information and the binaural parameter to the downmix signal.

In the above description, the embodiments for generating a binaural output are explained. Like the first embodiment, if a binaural output is directly generated via a downmix processing unit, a complicated scheme of a multi-channel decoder needs not to be performed. Therefore, complexity can be lowered. Like the second embodiment, if a multi-channel decoder is used, it is able to use a function of the multi-channel decoder.

3. Control of Independent Object (Karaoke Mode/a Cappella Mode)

In the following description, a technique for controlling an independent object or a background object by receiving a mono downmix is explained.

Figure 7:
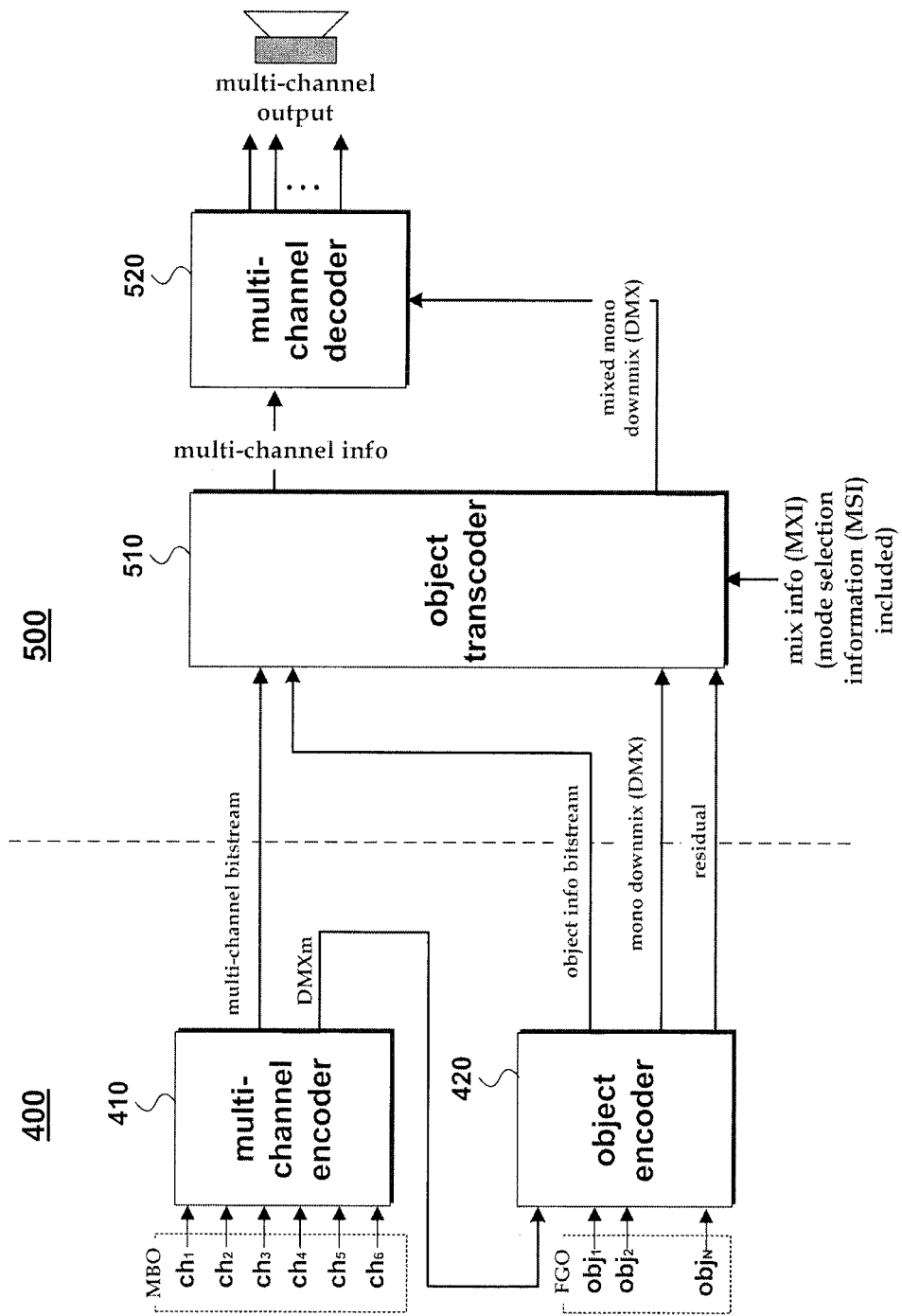
FIG. 7 is a block diagram of an apparatus for processing an audio signal according to one embodiment of the present invention for controlling an independent object.
Figure 8:
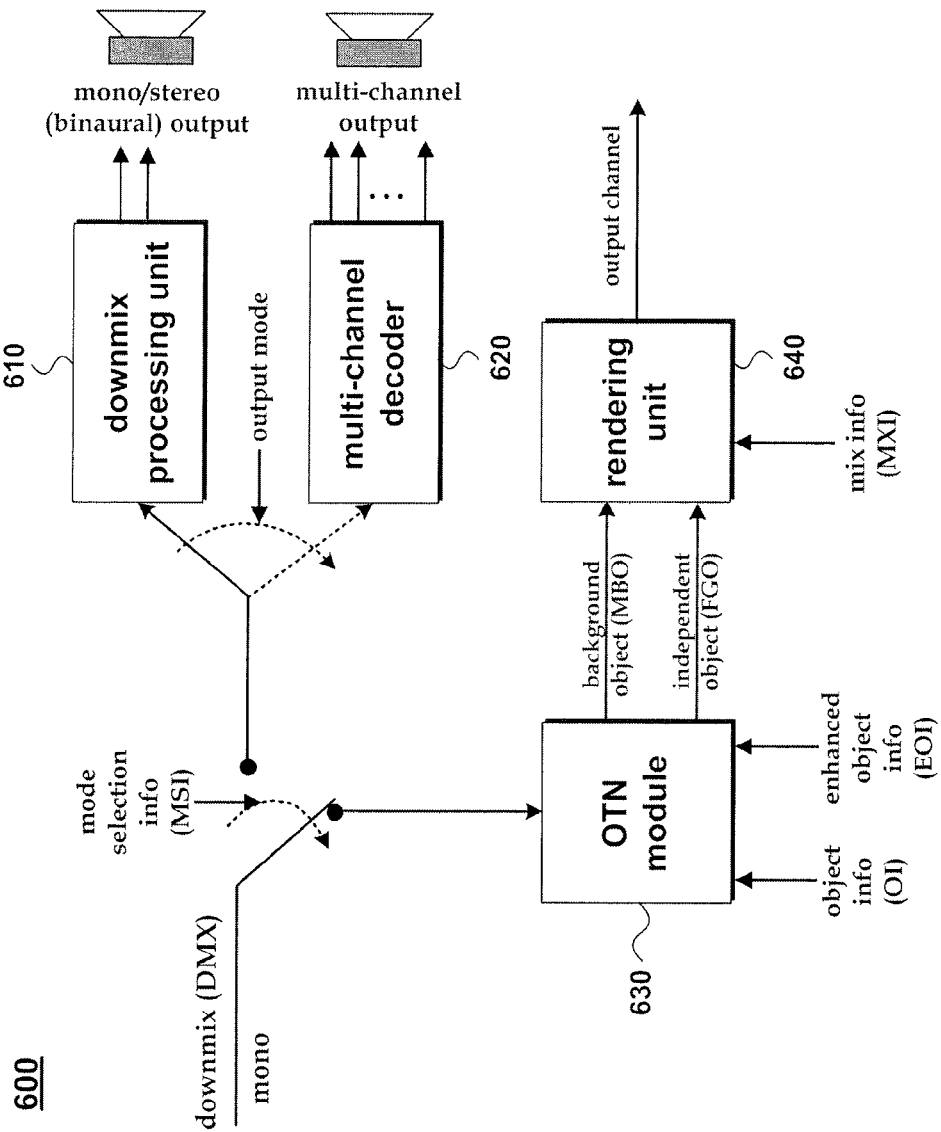
FIG. 8 is a block diagram of an apparatus for processing an audio signal according to another embodiment of the present invention for controlling an independent object.

FIG. 7 is a block diagram of an apparatus for processing an audio signal according to one embodiment of the present invention for controlling an independent object, and FIG. 8 is a block diagram of an apparatus for processing an audio signal according to another embodiment of the present invention for controlling an independent object.

Referring to FIG. 7, a multi-channel decoder 410 of an audio signal encoding apparatus 400 receives a plurality of channel signals and then generates a mono downmix (DMXm) and a multi-channel bitstream. In this case, a plurality of the channels signals are multi-channel background objects (MBO).

For instance, the multi-channel background object (MBO) is able to include a plurality of instrument signals configuring background music. Yet, it is unable to know how many source signals (e.g., instrument signals) are included. And, they are uncontrollable per source signal. Although the background object can be downmixed into a stereo channel, the present invention intends to describe a background object downmixed into a mono signal only.

An object encoder 420 generates a mono downmix (DMX) by downmixing a mono background object (DMXm) and at least one object signal ($obj_N$) and also generates an object information bitstream. In this case, the at least one object signal (or an object based signal) is an independent object and can be called a foreground object (FGO). For instance, if a background object is accompaniment, an independent object (FGO) can correspond to a lead vocal signal. Of course, if two independent objects exist, the can correspond to a vocal signal of a singer 1 and a vocal signal of a singer 2, respectively. And, the object encoder 420 is able to further generate residual information.

The object encoder 420 is able to generate a residual in the course of downmixing the mono background object (DMXm) and the object signal ($obj_N$) (i.e., independent object). This residual is usable for a decoder to extract an independent object (or, background object) from a downmix signal.

An object transcoder 510 of an audio signal decoding apparatus 500 extracts at least one independent object or a background object from the downmix (DMX) using enhanced object information (e.g., residual), according to mode selection information (MSI) included in mix information (MXI).

The mode selection information (MSI) includes the information indicating whether a mode for controlling a background object and at least one independent object is selected. Moreover, the mode selection information (MSI) can include the information indicating a prescribed mode corresponds to which one of modes including a normal mode, a mode for controlling a background object, and a mode for controlling at least one independent object. For instance, if a background object is background music, a mode for controlling a background object can correspond to 'a cappella' mode (or, solo mode). For instance, if an independent object is vocal, a mode for controlling at least one independent object may correspond to a karaoke mode. In other words, the mode selection information can be the information indicating whether one of the normal mode, the 'a cappella' mode and the karaoke mode is selected. Moreover, in case of the 'a cappella' or karaoke mode, information on gain adjustment can be further included. In summary, if the mode selection information (MSI) is the 'a cappella' or karaoke mode, at least one independent object or a background object is extracted from the downmix (DMX). In case of the normal mode, the downmix signal can undergo bypass.

If an independent object is extracted, the object transcoder 510 generates a mixed mono downmix by mixing at least one independent object and a background object using object information (OI), mix information (MI) and the like. In this case, the object information (OI) is the information extracted from the object information bitstream and may be identical to that explained in the foregoing description. And, the mix information (MM) can be the information for adjusting an object gain and/or panning.

Meanwhile, the object transcoder 510 generates multi-channel information (MI) using the multi-channel bitstream and/or the object information bitstream. The multi-channel information (MI) may be provided to control the background object or the at least one independent object. In this case, the multi-channel information can include at least one of first multi-channel information for controlling the background object and second multi-channel information for controlling the at least one independent object.

And, a multi-channel decoder 520 generates an output signal from a mono downmix mixed using the multi-channel information (MI) or a bypassed mono downmix.

FIG. 8 is a diagram of another embodiment for independent object generation.

Referring to FIG. 8, an audio signal processing unit 600 receives a mono downmix (DMX). The audio signal processing apparatus 600 includes a downmix processing unit 610, a multi-channel decoder 620, an OTN module 630 and a rendering unit 640.

The audio signal processing apparatus 600 determines whether to input the downmix signal to the OTN module 630, according to mode selection information (MSI). In this case, the mode selection information may be identical to the former mode selection information described with reference to FIG. 7.

If a current mode is a mode for controlling a background object (MBO) or at least one independent object (FGO) according to the mode selection information, the downmix signal is allowed to be inputted to the OTN module 630. If a current mode is a normal mode according to the mode selection information, the downmix signal bypasses the OTN module 530 but is inputted to the downmix processing unit 610 or the multi-channel decoder 620 according to an output mode. In this case, the output mode is identical to the output mode information (OM) described with reference to FIG. 1 and may include the number of output speakers.

In case that the output mode is mono/stereo/binaural output mode, the downmix is processed by the downmix processing unit 610. In this case, the downmix processing unit 610 can be the element playing the same role as the former downmix processing unit 130/130A/130B described with reference to FIG. 1/FIG. 2/FIG. 3.

In case that the output mode is a multi-channel mode, the multi-channel decoder 620 generates a multi-channel output from the mono downmix (DMX). Likewise, the multi-channel decoder 620 may be the element playing the same role as the former multi-channel decoder 140 described with reference to FIG. 1.

Meanwhile, if the mono downmix signal is inputted to the OTN module 630 according to the mode selection information (MSI), the OTN module 630 extracts a mono background object (MBO) and at least one independent object signal (FGO) from the downmix signal. In this case, OTN is an abbreviation of one-to-n. If one independent object signal exists, the OTN module can have OTT (one-to-two) structure. If two independent object signals exist, the OTN module can have OTT (one-to-three) structure. If there exist (N−1) independent object signals, the OTN module can have OTN structure.

The OTN module 630 is able to use object information (OI) and enhanced object information (EOI). In this case, the enhanced object information (EOI) can be a residual signal generated in the course of downmixing a background object and an independent object.

And, the rendering unit 640 generates an output channel signal by rendering background information (MBO) and independent object (FGO) using mix information (MXI). In this case, the mix information (MXI) includes the information for controlling the background object and/or the information for controlling the independent object. Meanwhile, multi-channel information (MI) can be generated based on the object information (OI) and the mix information (MXI). In this case, the output channel signal is inputted to a multi-channel decoder (not shown in the drawing) and can be then upmixed based on the multi-channel information.

Figure 9:
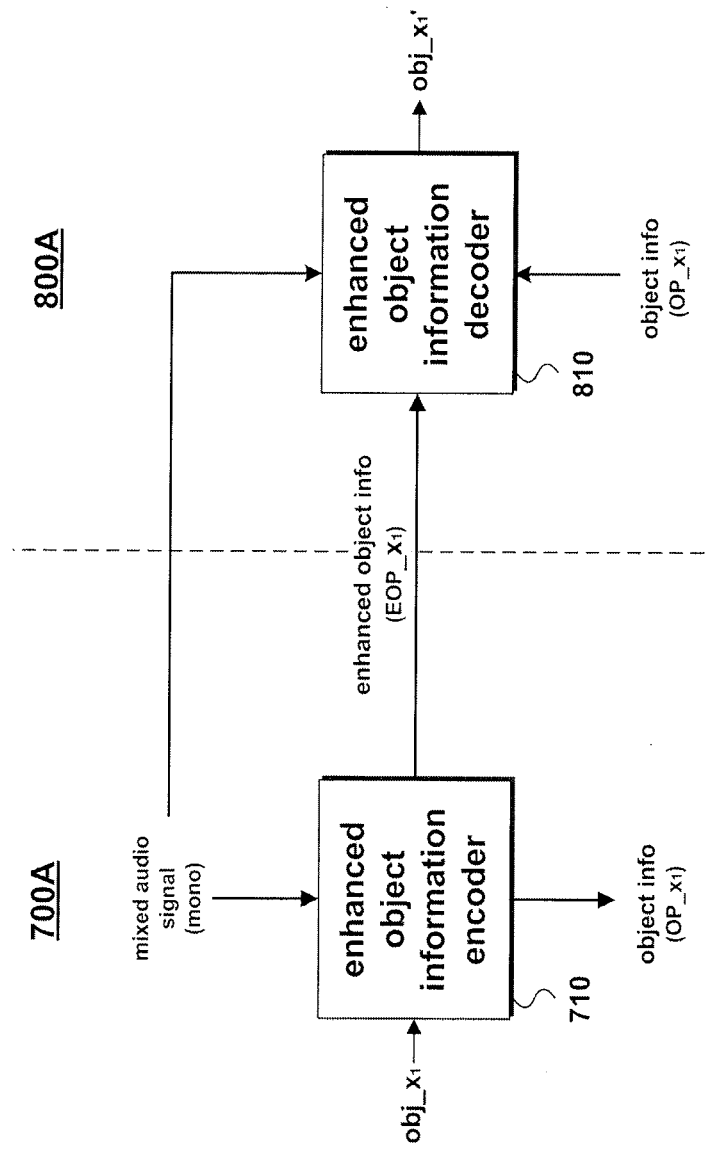
FIG. 9 is a block diagram of an apparatus for processing an audio signal according to a first embodiment of the present invention for processing an enhanced object.
Figure 10:
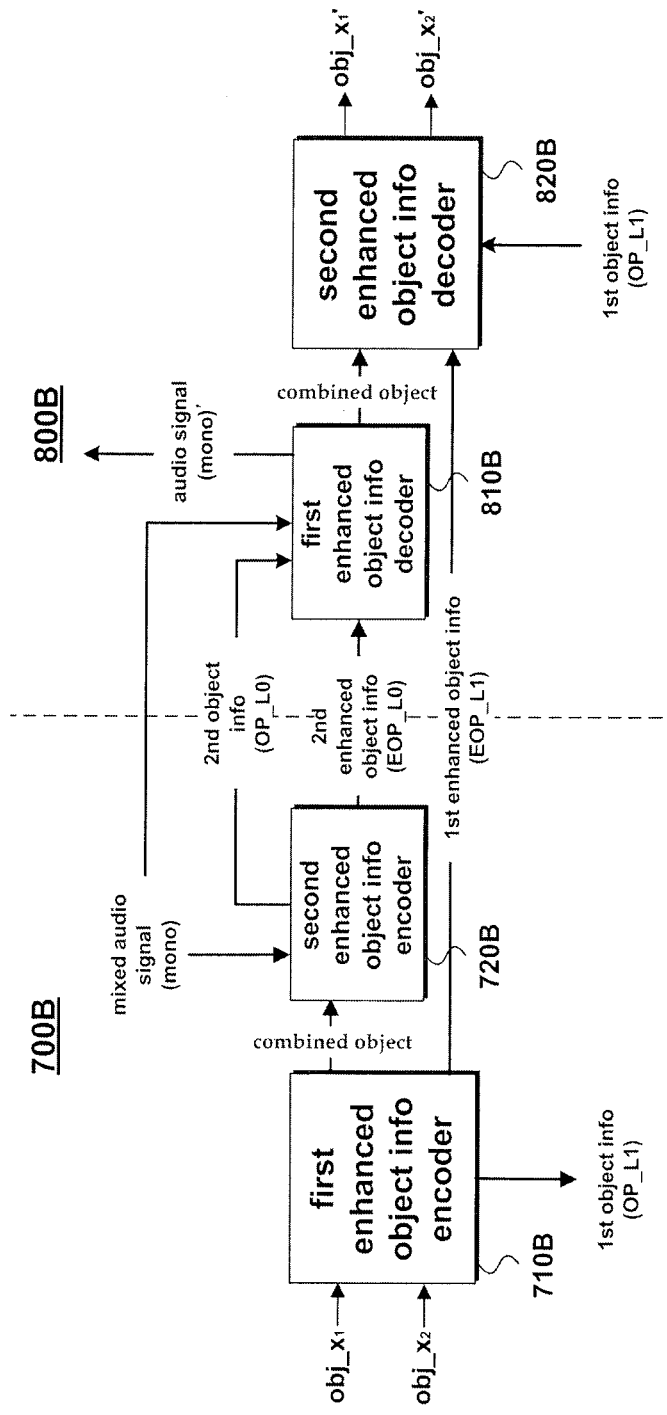
FIG. 10 is a block diagram of an apparatus for processing an audio signal according to a second embodiment of the present invention for processing an enhanced object.
Figure 11:
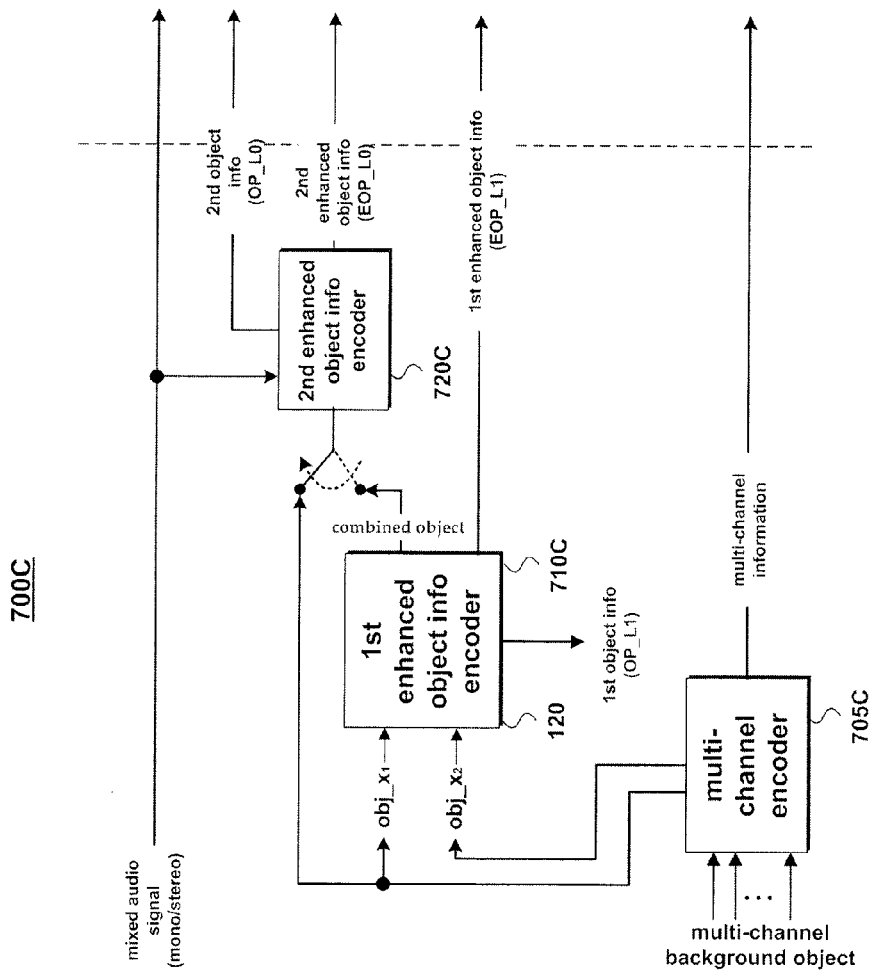
FIG. 11 and FIG. 12 are block diagrams of an apparatus for processing an audio signal according to a third embodiment of the present invention for processing an enhanced object.
Figure 12:
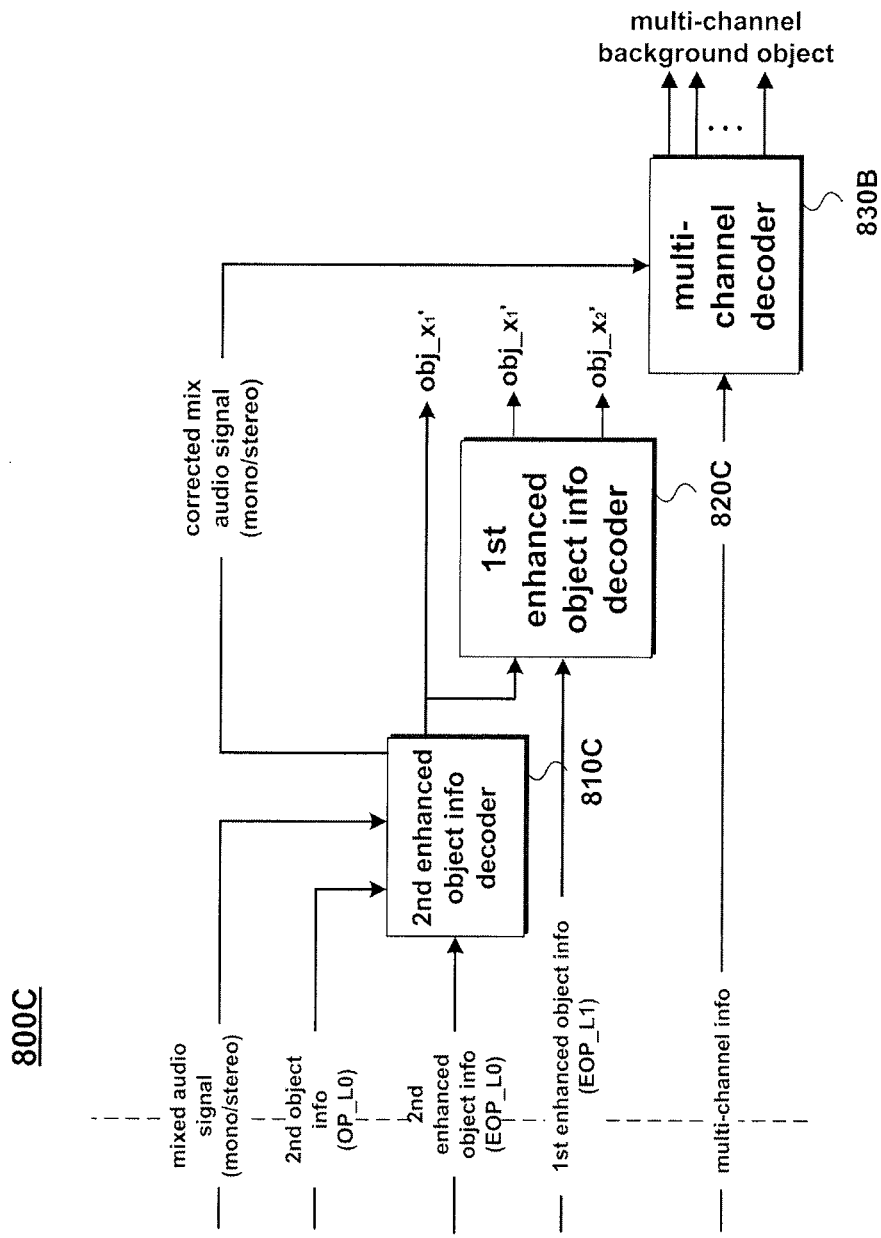

FIG. 9 is a block diagram of an apparatus for processing an audio signal according to a first embodiment of the present invention for processing an enhanced object, FIG. 10 is a block diagram of an apparatus for processing an audio signal according to a second embodiment of the present invention for processing an enhanced object, and FIG. 11 and FIG. 12 are block diagrams of an apparatus for processing an audio signal according to a third embodiment of the present invention for processing an enhanced object.

A first embodiment relates to a mono downmix and a mono object. A second embodiment relates to a mono downmix and a stereo object. And, a third embodiment relates to a case of covering both cases of the first and second embodiments.

Referring to FIG. 9, an enhanced object information encoder 710 of an audio signal encoding apparatus 700A generates enhanced object information (EOP_$x_1$) from a mixed audio signal, which is a mono signal, and an object signal (obj_$x_1$). In this case, as one signal is generated using two signals, the enhanced object information encoder 710 can be implemented as an OTT (one-to-two) encoding module. In this case, the enhanced object information (EOP_$x_1$) can be a residual signal. And, the enhanced object information encoder 710 generates object information (OP_$x_1$) corresponding to the OTT module.

An enhanced object information decoder 810 of an audio signal decoding apparatus 800A generates an output signal (obj_$x_1$') corresponding to additional remix data using the enhanced object information (EOP_$x_1$) and the mixed audio signal.

Referring to FIG. 10, an audio signal encoding apparatus 700B includes a first enhanced object information encoder 710B and a second enhanced object information encoder 720B. And, an audio signal decoding apparatus 800B includes a first enhanced object information decoder 820B and a second enhanced object information decoder 810B.

The first enhanced object information encoder 710B generates a combined object and first enhanced object information (EOP_L1) by combining two object signals (obj_$x_1$, obj_$x_2$) together. In this case, the two object signals can include a stereo object signal, i.e., a left channel signal of an object and a right channel signal of the object. In the course of generating the combined object, first object information (OP_L1) is generated.

The second enhanced object information encoder 720B generates second enhanced object information (EOP_L0) and second object information (OP_L0) using a mixed audio signal, which is a mono signal, and the combined object.

Thus, a final signal is generated through the above two steps. As each of the first and second enhanced object information encoders 710B and 720B generates one signal from two signals, it can be implemented as an OTT (one-to-two) module.

The audio signal decoding apparatus 800B performs a process in reverse to that of the audio signal encoding apparatus 700B.

In particular, the second enhanced object information decoder 810B generates a combined object using the second enhanced object information (EOP_L0) and the mixed audio signal. In this case, an audio signal can be further extracted.

And, the first enhanced object information decoder 820B generates two objects (obj_$x_1$', obj_$x_2$'), which are additional remix data, from the combined object using the first enhanced object information (EOP_L1).

FIG. 11 and FIG. 12 show the combined structure of the first and second embodiments. Referring to FIG. 11, if an enhanced object is changed into mono or stereo according to a presence or non-presence of operation of 5-1-5 or 5-2-5 tree structure of a multi-channel encoder 705C, a downmix signal is changed into a mono signal or a stereo signal.

Referring to FIG. 11 and FIG. 12, in case that an enhanced object is a mono signal, a first enhanced object information encoder 710C and a first enhanced information decoder 820C are not operated. Functions of elements are identical to those of the same names described with FIG. 10, respectively.

Meanwhile, in case that a downmix signal is mono, a second enhanced object information encoder 720C and a second enhanced information decoder 810C preferably operate as an OTT encoder and an OTT decoder, respectively. In case that a downmix signal is stereo, the second enhanced object information encoder 720C and the second enhanced information decoder 810C can operate as a ITT encoder and a TTT decoder, respectively.

According to the present invention, the above-described audio signal processing method can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example. Moreover, a bitstream generated by the encoding method is stored in a computer-readable recording medium or can be transmitted via wire/wireless communication network.

Accordingly, the present invention is applicable to encoding and decoding an audio signal.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

What is claimed is:

1. A method of processing an audio signal, the method comprising:
  receiving a downmix signal including at least one object signal, and object information extracted when the downmix signal is generated, the at least one object signal including a background object and at least one independent object;
  receiving mix information including mode selection information, the mix information for controlling the at least one object signal;
  receiving enhanced object information corresponding to a residual signal generated when the at least one object signal is downmixed to the downmix signal;
  when the mode selection information indicates a normal mode:
    generating downmix processing information by using the object information and the mix information, the downmix processing information for controlling the downmix signal; and
    generating a output signal by applying the downmix processed information to the downmix signal; and
  when the mode selection information indicates a mode for controlling the background object or a mode for controlling the at least one independent object:
    extracting the background object and the at least one independent object from the downmix signal, by using the enhanced object information; and
    rendering one of the background object and the at least one independent object based on the mix information,
  wherein the downmix signal and the output signal correspond to a mono signal.

2. The method of claim 1, wherein the at least one independent object corresponds to an object based signal, and
  wherein the background object corresponds to a mono signal.

3. An apparatus for processing an audio signal, the apparatus comprising:
  a demultiplexer configured to receive a downmix signal including at least one object signal, and object information extracted when the downmix signal is generated, the at least one object signal including a background object and at least one independent object;
  an object transcoder configured to receive mix information including mode selection information, the mix information for controlling the at least one object signal, and enhanced object information corresponding to a residual signal generated when the at least one object signal is downmixed to the downmix signal;
  a downmix processing unit configured to, when the mode selection information indicates a normal mode:
    generate downmix processing information by using the object information and the mix information, the downmix processing information for controlling the downmix signal; and
    generate an output signal by applying the downmix processed information to the downmix signal;
  an OTN module configured to, when the mode selection information indicates a mode for controlling the background object or a mode for controlling the at least one independent object, extract the background object and the at least one independent object from the downmix signal, by using the enhanced object information; and
  a rendering unit configured to render one of the background object and the at least one independent object based on the mix information,
  wherein the downmix signal and the output signal correspond to a mono signal.

4. The apparatus of claim 3, wherein the at least one independent object corresponds to an object based signal and wherein the background object corresponds to a mono signal.

5. A non-transitory computer-readable recording medium comprising a program stored therein, the program provided for executing a method of processing an audio signal, the computer-readable recording medium comprising:
  the program provided for executing the method of processing the audio signal, the method including:
    receiving a downmix signal including at least one object signal, and object information extracted when the downmix signal is generated, the at least one object signal including a background object and at least one independent object;
    receiving mix information including mode selection information, the mix information for controlling the at least one object signal;
    receiving enhanced object information corresponding to a residual signal generated when the at least one object signal is downmixed to the downmix signal;
    when the mode selection information indicates a normal mode:
      generating downmix processing information by using the object information and the mix information, the downmix processing information for controlling the downmix signal; and
      generating a output signal by applying the downmix processed information to the downmix signal; and when the mode selection information indicates a mode for controlling the background object or a mode for controlling the at least one independent object:
   extracting the background object and the at least one independent object from the downmix signal, by using the enhanced object information; and
   rendering one of the background object and the at least one independent object based on the mix information,
wherein the downmix signal and the output signal correspond to a mono signal.

* * * * *